US008374799B2

(12) United States Patent
Ivosev

(10) Patent No.: US 8,374,799 B2
(45) Date of Patent: Feb. 12, 2013

(54) SYSTEMS AND METHODS FOR EXTENDING THE DYNAMIC RANGE OF MASS SPECTROMETRY

(75) Inventor: Gordana Ivosev, Etobicoke (CA)

(73) Assignee: DH Technologies Development Pte. Ltd., Singapore (SG)

( * ) Notice: Subject to any disclaimer, the term of this patent is extended or adjusted under 35 U.S.C. 154(b) by 546 days.

(21) Appl. No.: 12/705,539

(22) Filed: Feb. 12, 2010

(65) Prior Publication Data

US 2011/0202287 A1 Aug. 18, 2011

(51) Int. Cl.
*G01N 23/00* (2006.01)

(52) U.S. Cl. ........................................................ 702/23

(58) Field of Classification Search ..................... 702/23
See application file for complete search history.

(56) References Cited

U.S. PATENT DOCUMENTS 7,423,259 B2 * 9/2008 Hidalgo et al. ............... 250/281

* cited by examiner

*Primary Examiner* — Stephen Cherry
(74) *Attorney, Agent, or Firm* — John R. Kasha; Kasha Law LLC

(57) ABSTRACT

Systems and methods are used to predict intensities of a saturated peak using a peak predictor. A set of data is selected from the plurality of intensity measurements that includes a saturated peak. Confidence values are assigned to each data point in the set of data producing a plurality of confidence value weighted data points. A peak predictor is selected. The peak predictor is applied to the plurality of confidence value weighted data points of the saturated peak producing predicted intensities for the saturated peak. The confidence values can include system confidence values, predictor confidence values, or a combination of system confidence values and predictor confidence values. The peak predictor can be a theoretical model, a dynamic model, an artificial neural network, or an analytical function representing a best fit of a plurality of probability density functions to a first set of measured data that includes a representative non-saturated peak.

21 Claims, 5 Drawing Sheets

SYSTEMS AND METHODS FOR EXTENDING THE DYNAMIC RANGE OF MASS SPECTROMETRY

INTRODUCTION

The dynamic range of a mass spectrometer is limited by a number of effects including ion source effects (saturation, suppression) and detector effects. Ion source effects can be alleviated by using an internal standard, but this does not help detector saturation since only the analyte is affected, assuming the internal standard concentration has been appropriately chosen. As the ion flux increases above the detector limit the chromatographic peak apex will start to flatten; in severe cases it can decrease and be smaller than the peak sides. This has two effects. First, the measured peak is smaller than the real ion flux. Second, a peak finder can detect two peaks in severe cases.

BRIEF DESCRIPTION OF THE DRAWINGS

The skilled artisan will understand that the drawings, described below, are for illustration purposes only. The drawings are not intended to limit the scope of the present teachings in any way.

Figure 1:
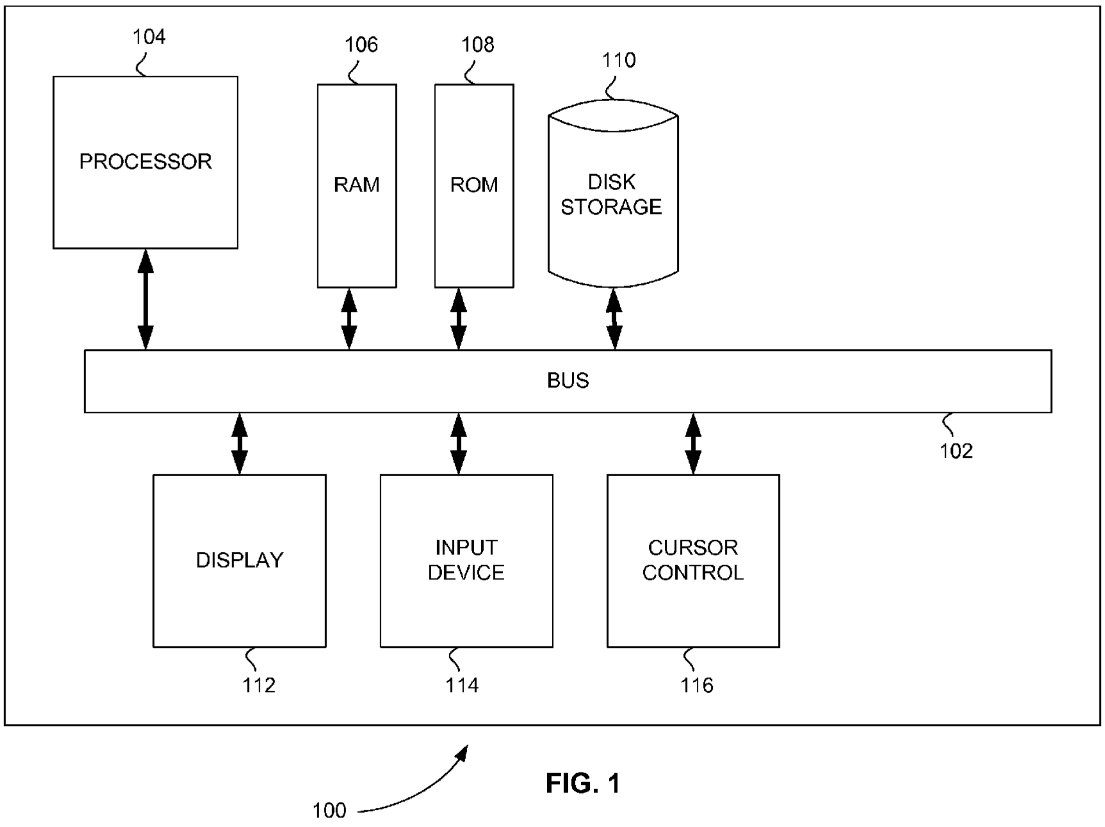
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for determining base calls, and instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, any other optical medium, punch cards, papertape , any other physical medium with patterns of holes, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Methods of Data Processing

As described above, the dynamic range of a mass spectrometer can be limited by detector saturation. Detector saturation can cause the apex of a peak to flatten and in severe cases it can decrease the peak apex so that it can be smaller than the peak sides.

Peak modeling is a technique that has been used in quantitation to find or deconvolve peaks from the raw data. Peak modeling typically involves fitting a probability density function or a mixture of probability density functions to a segment of data thought to include a peak. The probability density function or a mixture of probability density functions are fitted to each point of the segment of raw data. An analytical function representing the peak is found from the best fit and is called the peak model or peak profile. The peak model is typically used to identify or deconvolve the peak from the raw data. The position of the peak is the position of the apex or the position of the centroid, for example.

In various embodiments, a peak predictor is used to predict what the intensities would be in the saturated region of a saturated peak if the peak had not been saturated. In other words, a peak predictor is used to perform saturation correction on a saturated peak.

In contrast to peak modeling or peak deconvolution, however, the peak predictor cannot always be fitted to each point of the segment of raw data thought to include the saturated peak. This is because the raw data includes both unreliable (saturated) data and reliable (non-saturated) data. Instead, the peak predictor uses only reliable data. In various embodiments, the unreliable and reliable are determined using confidence values.

Figure 2:
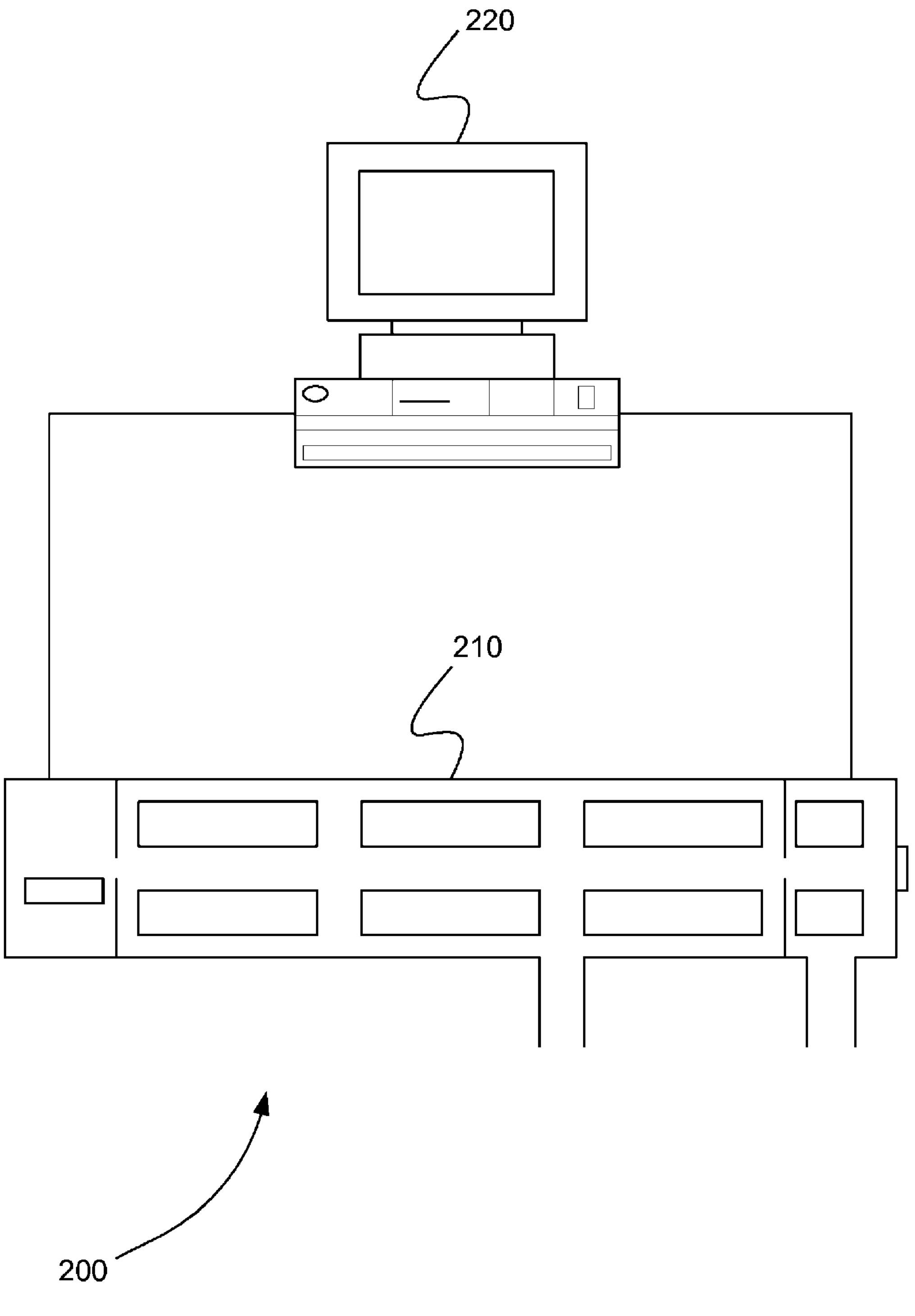
FIG. 2 is a schematic diagram showing a system for predicting intensities of a saturated peak using a peak predictor, in accordance with the present teachings.

FIG. 2 is a schematic diagram showing a system 200 for predicting intensities of a saturated peak using a peak predictor, in accordance with the present teachings. System 200 includes mass spectrometer 210 and processor 220. Processor 220 can be, but is not limited to, a computer, microprocessor, or any device capable of sending and receiving control signals and data from mass spectrometer 210 and processing data. Mass spectrometer 210 can include, but is not limited to including, a time-of-flight (TOF), quadrupole, ion trap, Fourier transform, Orbitrap, or magnetic sector mass spectrometer. Mass spectrometer 210 can also include a separation device (not shown). The separation device can perform a separation technique that includes, but is not limited to, liquid chromatography, gas chromatography, capillary electrophoresis, or ion mobility.

Mass spectrometer 210 performs a plurality of scans producing a plurality of intensity measurements. Processor 220 is in communication with the mass spectrometer 210. Processor 220 performs a number of steps.

Processor 220 obtains the plurality of intensity measurements from mass spectrometer 210. Processor 220 selects a set of data from the plurality of intensity measurements that includes a saturated peak. Processor 220 assigns confidence values to each data point in the set of data producing a plurality of confidence value weighted data points. Processor 220 selects a peak predictor for the saturated peak. Finally, processor 220 applies the peak predictor to the plurality of confidence value weighted data points of the saturated peak and produces predicted intensities for the saturated peak using the peak predictor.

In various embodiments, the confidence values assigned by processor 220 can include, but are not limited to, system confidence values, predictor confidence values, or a combination of system confidence values and predictor confidence values. A system confidence value is based on a system characteristic, for example. A system characteristic can include, but is not limited to, a hardware component characteristic, a software component characteristic, or a result of additional processing carried out prior to saturation correction. A hardware component characteristic can include the detector dynamic range, for example. The detector dynamic range can be affected by the detector and any other component of the detection system.

In various embodiments, a system confidence value between one and zero is assigned to each data point in the set of data based on a system characteristic. A system confidence of one indicates that the data is believed to be accurate, while a system confidence value of zero indicates that the data has been severely affected by saturation, for example. A system confidence value can be any number between one and zero, for example.

A predictor confidence value is found by comparing a predictor intensity to measured non-saturated peak data point, for example. Processor 220 can compare the peak predictor to measured non-saturated peak data and produce predictor confidence values for the peak predictor from the comparison. As with the system confidence values, a predictor confidence value can be any value between zero and one, for example. Predictor confidence values can be adjusted as the peak predictor is adjusted, for example.

Processor 220 can also combine predictor confidence values and system confidence values at each data point in the set of data. In various embodiments, predictor confidence values and system confidence values are multiplied, for example, at each data point in the set of data.

In various embodiments, the peak predictor provides an output for a measurement point not observed or not observed with a high degree of confidence. The peak predictor can be a theoretical model, a simulator, a dynamic model, or an artificial neural network, for example.

In various embodiments, the peak predictor can also be an analytical function representing a best fit of a plurality of probability density functions to a first set of measured data that includes a representative non-saturated peak. Processor 220 selects a first set of data from the plurality of intensity measurements that includes a representative non-saturated peak, for example. In various embodiments, the first set of data is selected around the largest non-saturated peak in a sample.

Processor 220 then fits a plurality of probability density functions to the first set of data. The plurality of probability density functions produces a peak predictor that is an analytical function representing a best fit of the plurality of probability density functions to the first set of data. The representative non-saturated peak can be a chromatographic peak or a mass spectral peak, for example. The plurality of probability density functions can include, but is not limited to including, a Gaussian function, a Lorentzian function, a Voigt function, a Weibull function, an exponential function, a polynomial function, or any combination of these functions. In various embodiments, the plurality of probability density functions can include three Gaussian functions.

In various embodiments, processor 220 predicts intensities of the saturated peak from a best fit of the peak predictor using traditional fitting, a maximum likelihood criterion, or any other optimization technique. Traditional fitting includes using an algorithm that minimizes the sum of squared differences or the sum of orthogonal differences between the peak predictor and the data points with nonzero confidence values. A maximum likelihood criterion attempts to find an optimum solution by minimizing a logarithmic function.

In various embodiments, the best fit of the peak predictor to the data points with nonzero confidence values is found by varying one or more model parameters to find the optimum fit. Model parameters can include, but are not limited to, position, width, and height of one or more probability density functions that make up the peak predictor.

In various embodiments, a priori knowledge of the shape of real peaks can be used to determine the parameters of the peak predictor. For example, if chromatographic peaks are known to stretch out along the independent axis, a constraint on a width parameter of the peak predictor can be defined to only allow variation along the independent axis in the fitting process.

Figure 3:
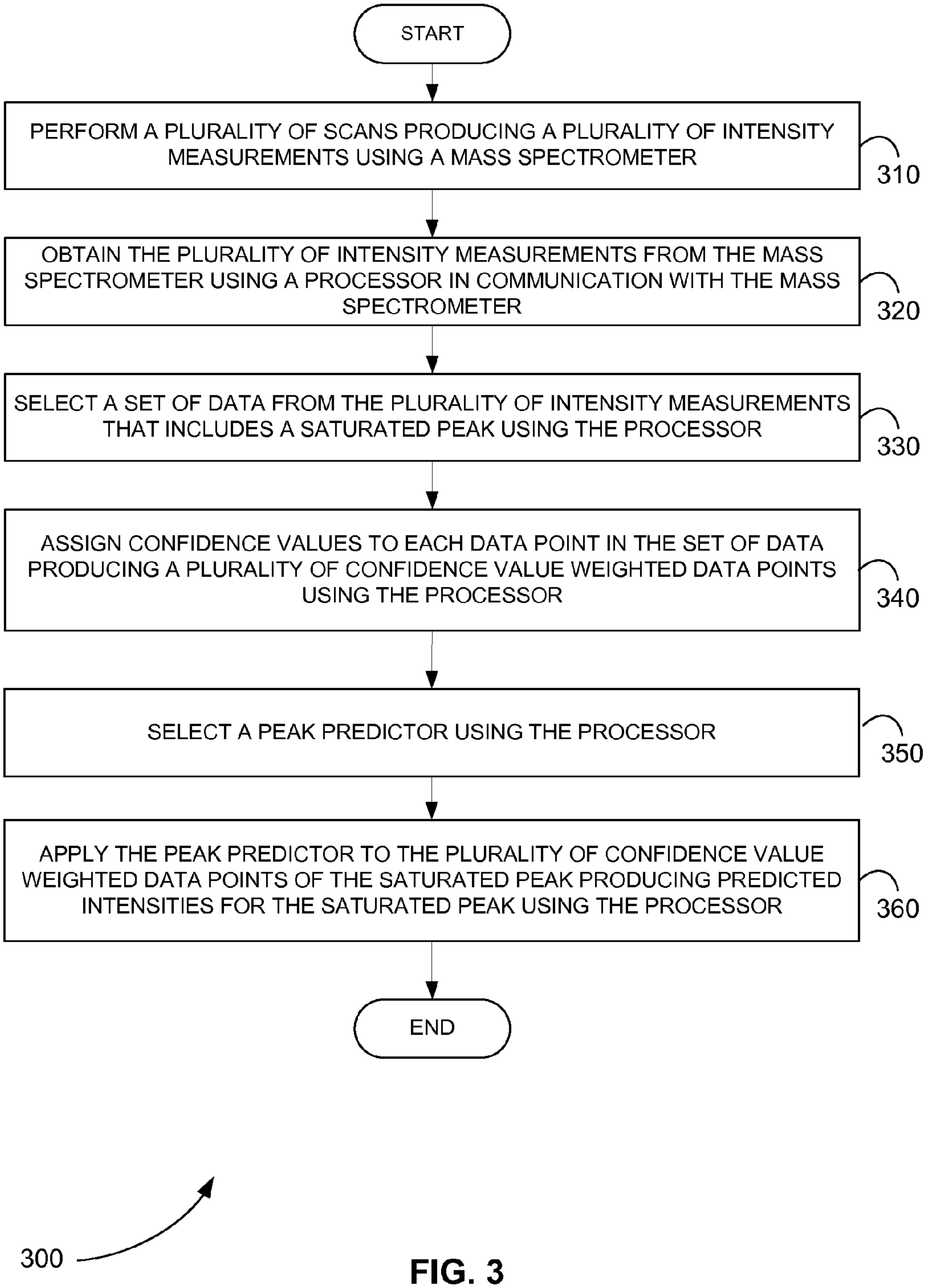
FIG. 3 is an exemplary flowchart showing a method for predicting intensities of a saturated peak using a peak predictor that is consistent with the present teachings.

FIG. 3 is an exemplary flowchart showing a method 300 for predicting intensities of a saturated peak using a peak predictor that is consistent with the present teachings.

In step 310 of method 300, a plurality of scans are performed producing a plurality of intensity measurements using a mass spectrometer.

In step 320, the plurality of intensity measurements is obtained from the mass spectrometer using a processor in communication with the mass spectrometer.

In step 330, a set of data is selected from the plurality of intensity measurements that includes a saturated peak using the processor.

In step 340, confidence values are assigned to each data point in the set of data producing a plurality of confidence value weighted data points using the processor.

In step 350, a peak predictor is selected using the processor.

In step 360, the peak predictor is applied to the plurality of confidence value weighted data points of the saturated peak producing predicted intensities for the saturated peak using the processor.

In various embodiments, steps 350 and 360 can be repeated for one or more additional saturated peaks. The same peak predictor is used for the one or more additional saturated peaks, for example.

In various embodiments, a computer program product includes a tangible computer-readable storage medium whose contents include a program with instructions being executed on a processor so as to perform a method for predicting intensities of a saturated peak using a peak predictor. This method is performed by a system of distinct software modules.

Figure 4:
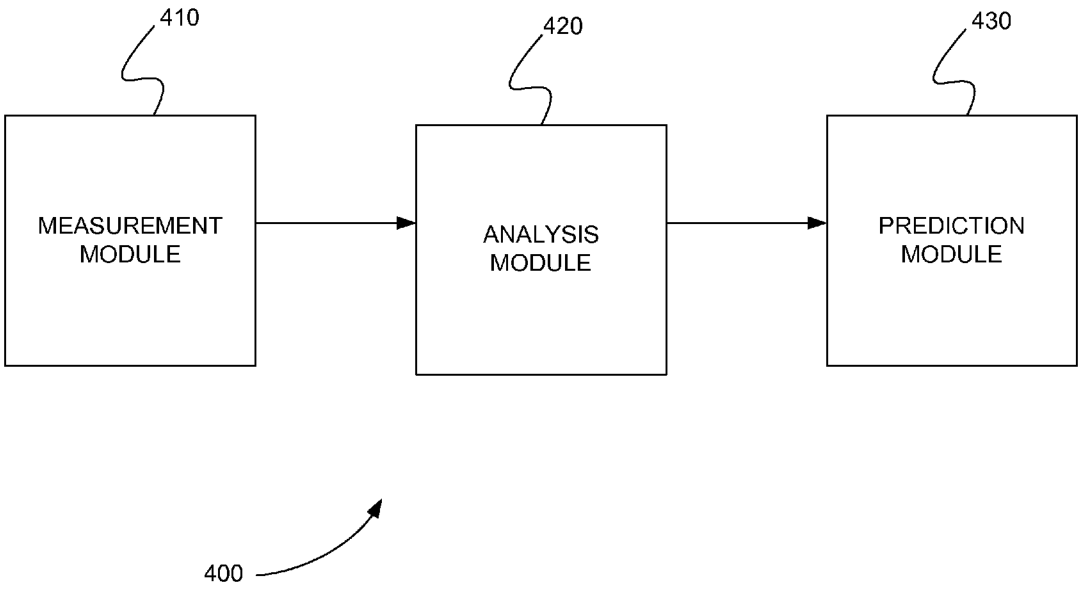
FIG. 4 is a schematic diagram of a system of distinct software modules that performs a method for predicting intensities of a saturated peak using a peak predictor, in accordance with the present teachings.

FIG. 4 is a schematic diagram of a system 400 of distinct software modules that performs a method for predicting intensities of a saturated peak using a peak predictor, in accordance with the present teachings. System 400 includes measurement module 410, analysis module 420, and prediction module 430.

Measurement module 410, analysis module 420, and prediction module 430 perform a number of steps.

Measurement module 410 obtains a plurality of intensity measurements from a mass spectrometer that performs a plurality of scans.

Analysis module 420 selects a set of data from the plurality of intensity measurements that includes a saturated peak. Analysis module 420 then assigns confidence values to each data point in the set of data producing a plurality of confidence value weighted data points.

Prediction module 430 selects a peak predictor. Prediction module then applies the peak predictor to the plurality of confidence value weighted data points of the saturated peak producing predicted intensities for the saturated peak.

Aspects of the present teachings may be further understood in light of the following examples, which should not be construed as limiting the scope of the present teachings in any way.

Data Examples

Figure 5:
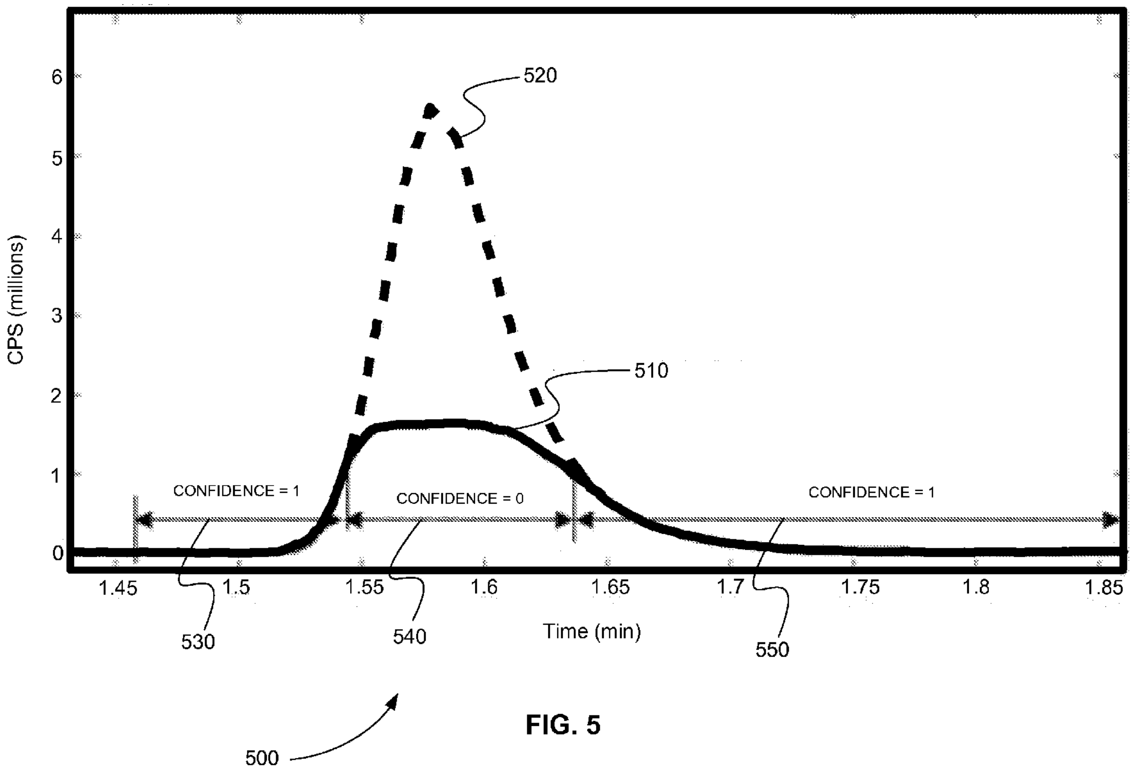
FIG. 5 is an exemplary plot of a saturated peak and a reconstructed peak that was predicted using a peak predictor, in accordance with the present teachings.

FIG. 5 is an exemplary plot 500 of a saturated peak 510 and a reconstructed peak 520 that was predicted using a peak predictor, in accordance with the present teachings.

A peak predictor was developed from a fitting of three Gaussian functions to a representative non-saturated peak. Predictor confidence values were calculated for the peak predictor. The data of saturated peak 510 was assigned system confidence values based on a detector dynamic range limit of approximately one million counts per second. The data in region 530 received a system confidence value of one, the data in region 540 received a system confidence value of zero, and data in region 550 received a system confidence value of one.

The peak predictor was fitted to the data of saturated peak 510 using only the data points that had combined predictor confidence values and system confidence values that were nonzero. The predictor confidence values and system confidence values were multiplied, for example. Reconstructed peak 520 is the best fit of the peak predictor to the data of saturated peak 510 that included combined nonzero predictor confidence values and system confidence values.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for predicting intensities of a saturated peak using a peak predictor, comprising:

a mass spectrometer that performs a plurality of scans producing a plurality of intensity measurements; and a processor in communication with the mass spectrometer, wherein the processor obtains the plurality of intensity measurements from the mass spectrometer, the processor selects a set of data from the plurality of intensity measurements that comprises a saturated peak, the processor assigns confidence values to each data point in the set of data producing a plurality of confidence value weighted data points, the processor selects a peak predictor, and the processor applies the peak predictor to the plurality of confidence value weighted data points of the saturated peak and produces predicted intensities for the saturated peak.

2. The system of claim 1, wherein the confidence values comprise system confidence values based on a system characteristic.

3. The system of claim 2, wherein the system characteristic comprises a detector dynamic range.

4. The system of claim 1, wherein the confidence values comprise predictor confidence values that are found by comparing predictor intensities to measured non-saturated peak data.

5. The system of claim 1, wherein the confidence values comprise combined system confidence values based on a system characteristic and predictor confidence values that are found by comparing predictor intensities to measured representative non-saturated peak data.

6. The system of claim 1, wherein the peak predictor comprises a theoretical model.

7. The system of claim 1, wherein the peak predictor comprises an analytical function representing a best fit of a plurality of probability density functions to a first set of measured data that includes a representative non-saturated peak.

8. The system of claim 7, wherein the plurality of probability density functions comprises three Gaussian functions.

9. The system of claim 1, wherein the saturated peak is a chromatographic peak.

10. The system of claim 1, wherein the saturated peak is a mass spectral peak.

11. A method for predicting intensities of a saturated peak using a peak predictor, comprising:

performing a plurality of scans producing a plurality of intensity measurements using a mass spectrometer;

obtaining the plurality of intensity measurements from the mass spectrometer using a processor in communication with the mass spectrometer;

selecting a set of data from the plurality of intensity measurements that comprises a saturated peak using the processor;

assigning confidence values to each data point in the set of data producing a plurality of confidence value weighted data points using the processor;

selecting a peak predictor using the processor; and applying the peak predictor to the plurality of confidence value weighted data points of the saturated peak producing predicted intensities for the saturated peak using the processor.

12. The method of claim 11, wherein the confidence values comprise system confidence values based on a system characteristic.

13. The method of claim 12, wherein the system characteristic comprises a detector dynamic range.

14. The method of claim 11, wherein the confidence values comprise predictor confidence values that are found by comparing predictor intensities to measured non-saturated peak data.

15. The method of claim 11, wherein the confidence values comprise combined system confidence values based on a system characteristic and predictor confidence values that are found by comparing predictor intensities to measured representative non-saturated peak data.

16. The method of claim 11, wherein the peak predictor comprises a theoretical model.

17. The method of claim 11, wherein the peak predictor comprises an analytical function representing a best fit of a plurality of probability density functions to a first set of measured data that includes a representative non-saturated peak.

18. The method of claim 17, wherein the plurality of probability density functions comprises three Gaussian functions.

19. The method of claim 11, wherein the saturated peak is a chromatographic peak.

20. The method of claim 11, wherein the saturated peak is a mass spectral peak.

21. A computer program product, comprising a tangible non-transitory computer-readable storage medium whose contents include a program with instructions being executed on a processor so as to perform a method for predicting intensities of a saturated peak using a peak predictor, the method comprising:

providing a system, wherein the system comprises distinct software modules, and wherein the distinct software modules comprise a measurement module, an analysis module, and a prediction module;

obtaining a plurality of intensity measurements from a mass spectrometer that performs a plurality of scans using the measurement module;

selecting a set of data from the plurality of intensity measurements that comprises a saturated peak using the analysis module;

assigning confidence values to each data point in the set of data producing a plurality of confidence value weighted data points using the analysis module;

selecting a peak predictor using the prediction module; and applying the peak predictor to the plurality of confidence value weighted data points of the saturated peak producing predicted intensities for the saturated peak using the prediction module.

* * * * *